US012604209B2

(12) United States Patent
Nakahira et al.

(10) Patent No.: US 12,604,209 B2
(45) Date of Patent: Apr. 14, 2026

(54) BASE STATION ALLOCATION SUPPORT APPARATUS, BASE STATION ALLOCATION SUPPORT METHOD AND PROGRAM

(71) Applicant: NTT, Inc.

(72) Inventors: Toshiro Nakahira, Tokyo (JP);
Motoharu Sasaki, Tokyo (JP);
Takatsune Moriyama, Tokyo (JP);
Yasushi Takatori, Tokyo (JP)

(73) Assignee: NTT, Inc., Tokyo (JP)

( * ) Notice: Subject to any disclaimer, the term of this patent is extended or adjusted under 35 U.S.C. 154(b) by 315 days.

(21) Appl. No.: 18/275,394

(22) PCT Filed: Feb. 9, 2021

(86) PCT No.: PCT/JP2021/004786
§ 371 (c)(1),
(2) Date: Aug. 1, 2023

(87) PCT Pub. No.: WO2022/172332
PCT Pub. Date: Aug. 18, 2022

(65) Prior Publication Data
US 2024/0114350 A1      Apr. 4, 2024

(51) Int. Cl.
*H04W 16/18* (2009.01)
*H04W 84/12* (2009.01)

(52) U.S. Cl.
CPC ............ *H04W 16/18* (2013.01); *H04W 84/12* (2013.01)

(58) Field of Classification Search
CPC ...... H04W 16/18; H04W 84/12; H04W 16/22
See application file for complete search history.

(56) References Cited

U.S. PATENT DOCUMENTS 7,298,327 B2 *  11/2007  Dupray ................. G01S 5/0278
                                                          342/451
7,697,458 B2 *   4/2010  Park ...................... H04W 64/00
                                                          370/254
(Continued)

FOREIGN PATENT DOCUMENTS

JP          2016184898 A      10/2016
JP          2018107504 A       7/2018
(Continued)

OTHER PUBLICATIONS

Q. J. Cheng, J. K. -Y. Ng and K. C. Y. Shum, "A Wireless LAN Location Estimation System Using Center of Gravity as an Algorithm Selector for Enhancing Location Estimation," 2012 IEEE 26th International Conference on Advanced Information Networking and Applications, Fukuoka, Japan, 2012, pp. 261-268 (Year: 2012).*

(Continued)

*Primary Examiner* — Charles T Shedrick

(57) ABSTRACT

A base station allocation support apparatus includes a first calculation unit that calculates radio wave propagation attenuation values between a plurality of wireless terminals in a certain area based on position information of each of the plurality of wireless terminals and information indicating a layout of the area, a clustering unit that performs clustering on the plurality of wireless terminals based on the radio wave propagation attenuation values; and a determination unit that determines an arrangement position of a wireless base station with respect to the wireless terminals based on a result of the clustering.

8 Claims, 9 Drawing Sheets

10

(56) References Cited

U.S. PATENT DOCUMENTS

| | | | | |
|---|---|---|---|---|
| 9,479,943 | B1 * | 10/2016 | Ofir | H04W 64/00 |
| 2006/0276201 | A1 * | 12/2006 | Dupray | H04W 4/029 |
| | | | | 455/456.1 |
| 2007/0066317 | A1 * | 3/2007 | Amft | H04W 16/18 |
| | | | | 455/446 |
| 2007/0081496 | A1 * | 4/2007 | Karge | H04W 64/00 |
| | | | | 370/331 |
| 2010/0081390 | A1 * | 4/2010 | Motoyoshi | H04B 17/3912 |
| | | | | 455/67.11 |
| 2015/0156640 | A1 * | 6/2015 | Nguyen | H04W 16/18 |
| | | | | 455/422.1 |
| 2017/0094633 | A1 * | 3/2017 | Ofir | H04W 24/02 |
| 2021/0289365 | A1 | 9/2021 | Nakano et al. | |
| 2022/0141672 | A1 * | 5/2022 | Omiya | H04W 16/18 |
| | | | | 455/446 |
| 2023/0199513 | A1 * | 6/2023 | Colonna | H04W 4/021 |
| | | | | 455/456.1 |
| 2023/0247441 | A1 * | 8/2023 | Nakahira | H04W 16/18 |
| | | | | 455/446 |
| 2024/0080677 | A1 * | 3/2024 | Nakayama | H04W 84/00 |

FOREIGN PATENT DOCUMENTS

| | | | |
|---|---|---|---|
| JP | 2019009658 | A | 1/2019 |
| JP | 2019033435 | A | 2/2019 |

OTHER PUBLICATIONS

Arai et al. (2016) "Proposal of Adaptive Movable AP System for Offloading Efficiency Enhancement," IEICE Technical Report, RCS2016-43, pp. 107-112.

J. Macqueen (1967) "Some Methods for Classification and Analysis of Multivariate Observations," Proc. of 5th Berkeley Symposium on Mathematical Statistics and Probability, pp. 281-297.

* cited by examiner

Fig. 6

| | 20-A | 20-B | ⋮ | 20-F |
|---|---|---|---|---|
| 20-A | – | ~20 | ⋮ | ~90 |
| 20-B | ~20 | – | ⋮ | ~75 |
| ⋮ | ⋮ | ⋮ | ⋮ | ⋮ |
| 20-F | ~90 | ~75 | ⋮ | – |

UNITS: [dB]

Fig. 7

| | 20-A | 20-B | ... | 20-F |
|---|---|---|---|---|
| 20-A | — | 10 | ... | 110 |
| 20-B | 10 | — | ... | 90 |
| ... | ... | ... | ... | ... |
| 20-F | 110 | 90 | ... | — |

UNITS: [m]

BASE STATION ALLOCATION SUPPORT APPARATUS, BASE STATION ALLOCATION SUPPORT METHOD AND PROGRAM

CROSS-REFERENCE TO RELATED APPLICATIONS

This application is a U.S. National Stage Application filed under 35 U.S.C. § 371 claiming priority to International Patent Application No. PCT/JP2021/004786, filed on 9 Feb. 2021, the disclosure of which is hereby incorporated herein by reference in its entirety.

TECHNICAL FIELD

The present invention relates to a base station allocation support apparatus, a base station allocation support method, and a program.

BACKGROUND ART

In recent years, users who use large-volume contents with wireless terminals have increased with rapid popularization of wireless terminals such as smartphones and tablets, and the volume of traffic in wireless networks has rapidly increased. The IEEE 802.11 wireless LAN standard, which is widely used in a high-speed wireless access system using radio waves in a band for which no license for a wireless system is required, is often used to easily accommodate wireless traffic at a low cost. Wireless LAN networks are provided in various areas including private areas such as homes and offices and public areas such as stores, stations, and airports.

When wireless LAN networks are constructed, it is necessary to construct the wireless LAN networks in consideration of various factors such as construction of wireless base station devices, wireless LAN communication portions such as parameter settings, network portions such as between switches and wireless base stations and between switches and backhaul lines, and high-level service portions such as user authentication and portal screens. Among them, the installation information of the wireless base station devices in the construction of the wireless base station devices is focused upon here.

In general, when wireless signals attenuate due to propagation distances or obstructions in wireless communication, quality or volume of wireless communication is reduced. Therefore, states in which a distance between a wireless base station and a wireless terminal is short and a propagation path is not obstructed are preferable. On the other hand, since the number of wireless base stations that can be installed is restricted due to costs incurred for devices, installation, and running, wireless radio wave interference, and the like, it is important to install a required number of wireless base stations at appropriate locations in an area that is covered by a wireless LAN. There is a limit to the distance that radio wave can reach from a wireless base station and the number of users that can be accommodated by one wireless base station, and depending on these conditions, it is necessary to determine the number and locations of wireless base stations to be installed.

As a method for calculating the installation locations of wireless base stations, for example, NPL 1 proposes a technique for dynamically changing positions of wireless base stations according to the distribution of users within an area and using the k-means clustering technique shown in NPL 2, and calculating the installation locations of wireless base stations according to user positions within an area.

CITATION LIST

Non Patent Literature

[NPL 1] Takuto Arai, Daisuke Goto, Masashi Iwabuchi, Tatsuhiko Iwakuni, Kazuki Maruta, "Proposal of Adaptive Movable AP System for Offloading Efficiency Enhancement," IEICE technical report, RCS2016-43, pp. 107-112, May 2016.
[NPL 2] J. Macqueen, "SOME METHODS FOR CLASSIFICATION AND ANALYSIS OF MULTIVARIATE OBSERVATIONS," Proc. of 5th Berkeley Symposium on Mathematical Statistics and Probability, pp. 281-297, 1967.

SUMMARY OF INVENTION

Technical Problem

However, in the prior art described above, since clustering is performed based on the physical distance between the wireless base station and the terminal, the installation information of the wireless base stations considering the actual radio wave propagation environment (shielding, radio wave reflection, or the like) could not be calculated.

The present invention has been made in view of the above points, and an object of the present invention is to support the allocation of wireless base stations in consideration of radio wave propagation conditions.

Solution to Problem

In order to solve the above problem, a base station allocation support apparatus includes a first calculation unit that calculates radio wave propagation attenuation values between a plurality of wireless terminals in a certain area based on position information of each of the plurality of wireless terminals and information indicating a layout of the area, a clustering unit that performs clustering on the plurality of wireless terminals based on the radio wave propagation attenuation values; and a determination unit that determines an allocation position of a wireless base station with respect to the wireless terminals based on a result of the clustering.

Advantageous Effects of Invention

The allocation of wireless base stations in consideration of a radio wave propagation state can be supported.

BRIEF DESCRIPTION OF DRAWINGS

FIG. 6 is a diagram illustrating an example of calculation results of radio wave propagation attenuation values of the paths between the terminals 20.

FIG. 7 is a diagram illustrating an example of a calculation result of a wireless distance between the terminals 20.

DESCRIPTION OF EMBODIMENTS

Hereinafter, an embodiment of the present invention will be described based on the drawings. The present embodiment discloses a calculation method of an allocation position of a wireless base station (hereinafter simply referred to as "base station 30"). The base station 30 may be fixedly allocated or movable.

First, a base station allocation support apparatus 10, which is an apparatus (computer) for calculating the allocation position of the base station 30, will be described.

Figure 1:
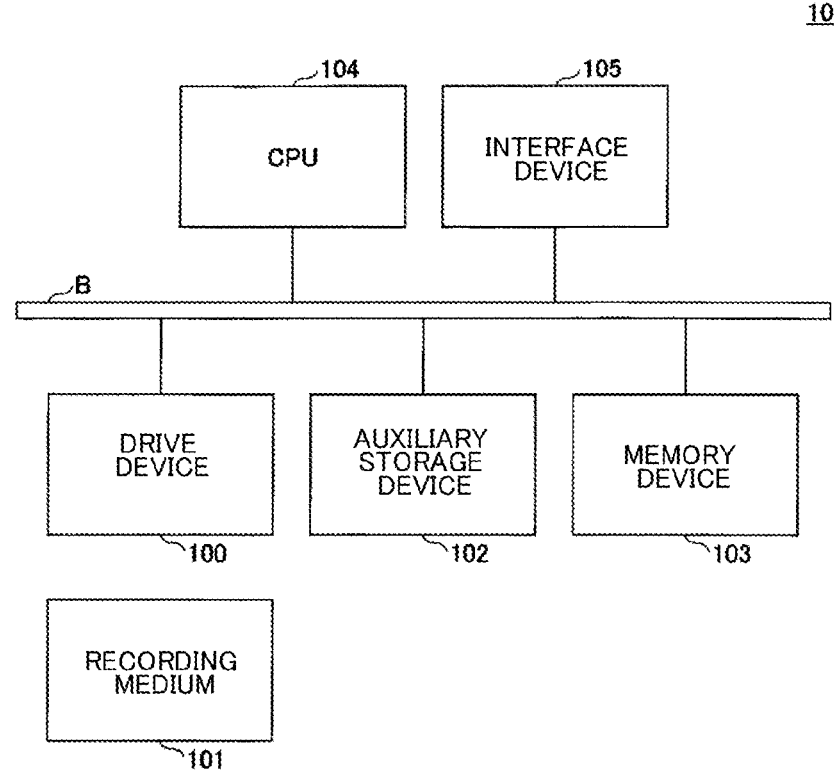
FIG. 1 is a diagram illustrating a hardware configuration example of a base station allocation support apparatus 10 according to an embodiment of the present invention.

FIG. 1 is a diagram illustrating a hardware configuration example of the base station allocation support apparatus 10 according to an embodiment of the present invention. The base station allocation support apparatus 10 of FIG. 1 includes a drive device 100, an auxiliary storage device 102, a memory device 103, a CPU 104, an interface device 105, and the like, all of which are connected to each other via a bus B.

A program that realizes processing in the base station allocation support apparatus 10 is provided by a recording medium 101 such as a CD-ROM. When the recording medium 101 that stores the program is set in the drive device 100, the program is installed in the auxiliary storage device 102 from the recording medium 101 via the drive device 100. However, the program does not necessarily have to be installed from the recording medium 101 and may be downloaded from another computer via a network. The auxiliary storage device 102 stores the installed program as well as necessary files, data, and the like.

When an instruction to activate the program is given, the memory device 103 reads out the program from the auxiliary storage device 102 and stores the program. The CPU 104 executes functions related to the base station allocation support apparatus 10 according to the program stored in the memory device 103. The interface device 105 is used as an interface for connection with a network.

Figure 2:
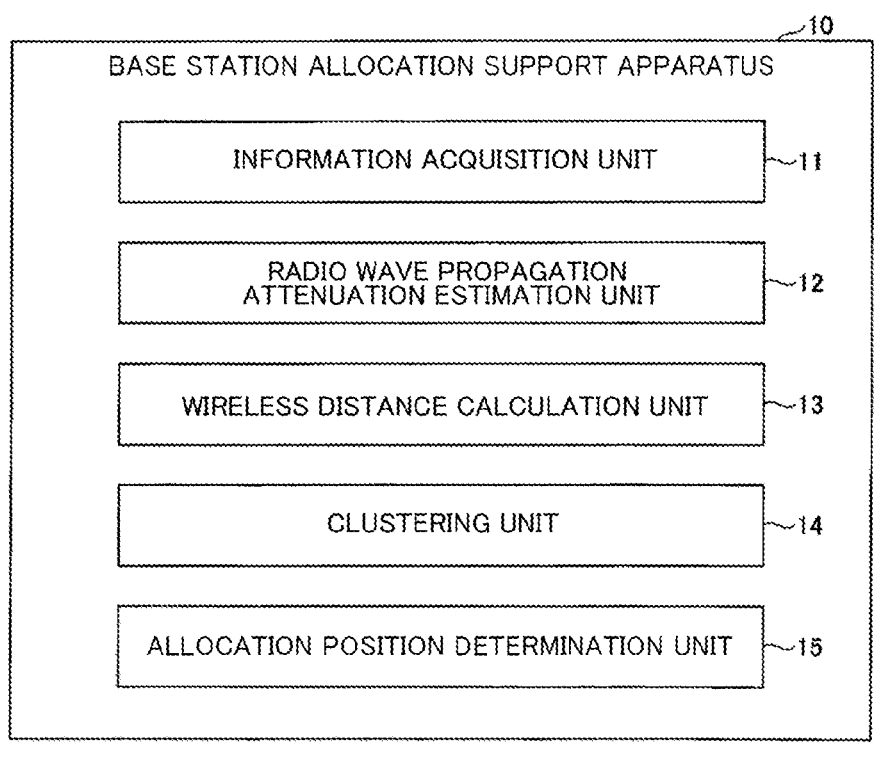
FIG. 2 is a diagram illustrating a functional configuration example of the base station allocation support apparatus 10 according to the embodiment of the present invention.

FIG. 2 is a diagram illustrating a functional configuration example of the base station allocation support apparatus 10 according to the embodiment of the present invention. In FIG. 2, the base station allocation support apparatus 10 includes an information acquisition unit 11, a radio wave propagation attenuation estimation unit 12, a wireless distance calculation unit 13, a clustering unit 14, an allocation position determination unit 15, and the like. These respective units are realized when one or more programs installed in the base station allocation support apparatus 10 causes the CPU 104 to execute processing. The program may be recorded on a recording medium and distributed, or may be distributed via a network.

Figure 3:
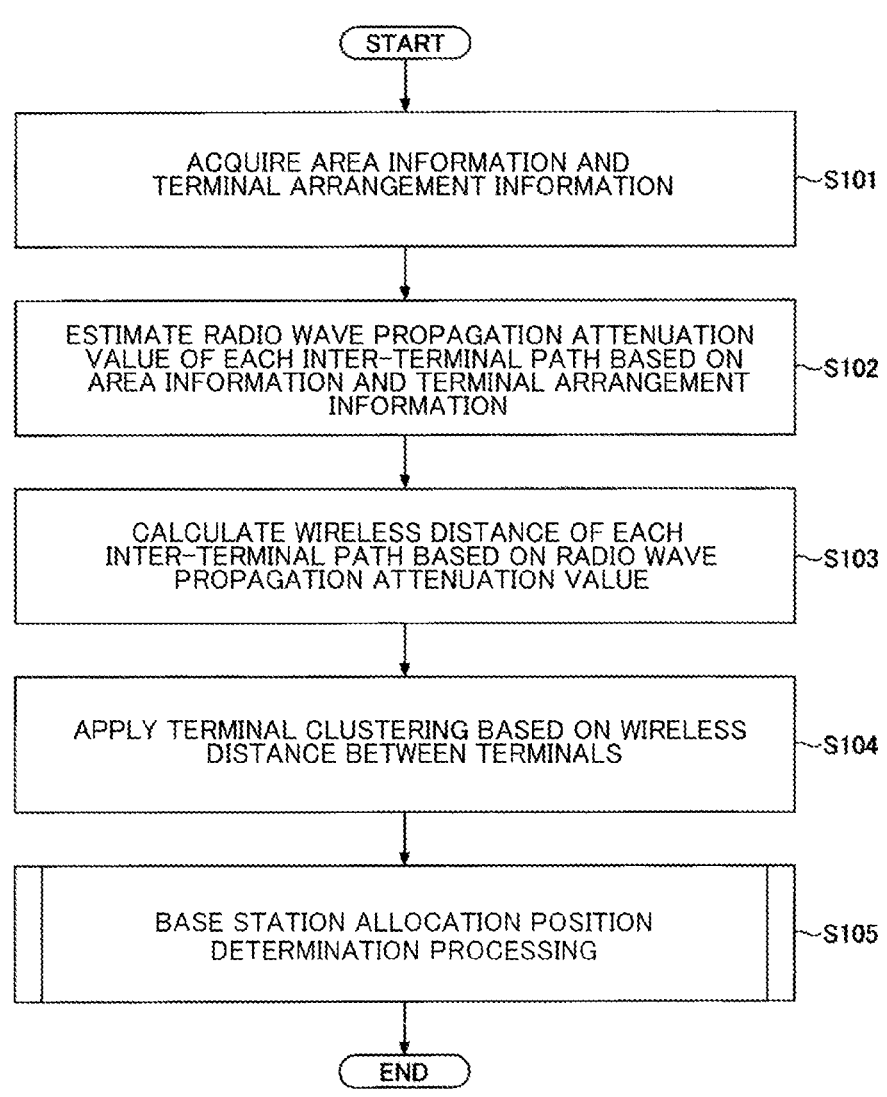
FIG. 3 is a flowchart for illustrating an example of processing procedures executed by the base station allocation support apparatus 10.

Hereinafter, the processing procedures executed by the base station allocation support apparatus 10 will be described. FIG. 3 is a flowchart for illustrating an example of the processing procedures executed by the base station allocation support apparatus 10.

In step S101, the information acquisition unit 11 acquires information (area information) related to an area where the base station 30 is to be allocated, and information (hereinafter referred to as "terminal arrangement information") indicating the respective positions of one or more wireless terminals (hereinafter simply referred to as "terminals 20") in the area. The area information means information indicating the layout of the area. More specifically, the area information is information indicating the size (shape) of the area, the arrangement state (position and shape of the object) of the wall and the object (shield of radio waves), material information, and the like.

Figure 4:
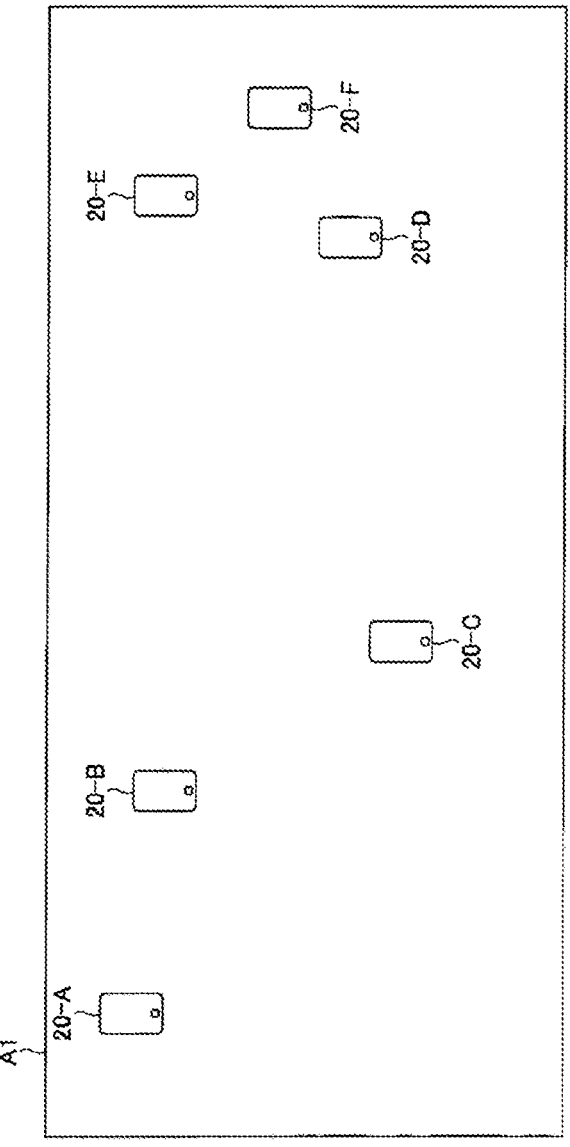
FIG. 4 is a diagram illustrating an example of terminal arrangement information.

FIG. 4 is a diagram illustrating an example of terminal arrangement information. As illustrated in FIG. 4, the terminal arrangement information is information indicating the positions of respective terminals 20 in an area A1 indicated by the area information. In the example illustrated in FIG. 4, six terminals 20A to 20F are arranged in the area A1 at positions illustrated in FIG. 4.

The area information is registered in, for example, the auxiliary storage device 102 of the base station allocation support apparatus 10 in advance. The terminal arrangement information can be acquired by using a known technique. For example, if it is outdoor, position information using a global positioning system (GPS) may be obtained. If it is indoors, it may be acquired by positioning using Bluetooth (registered trademark) beacon or the like, positioning using geomagnetism or the like. In addition, in a case where the positions of the terminals 20 are fixed, the position information of each of the terminals 20 may be registered in advance.

Subsequently, the radio wave propagation attenuation estimation unit 12 calculates estimation values (hereinafter referred to as "radio wave propagation attenuation values") of the radio wave propagation attenuation of paths between the terminals 20 based on the area information and the terminal arrangement information acquired in the step S101 (S102).

Figure 5:
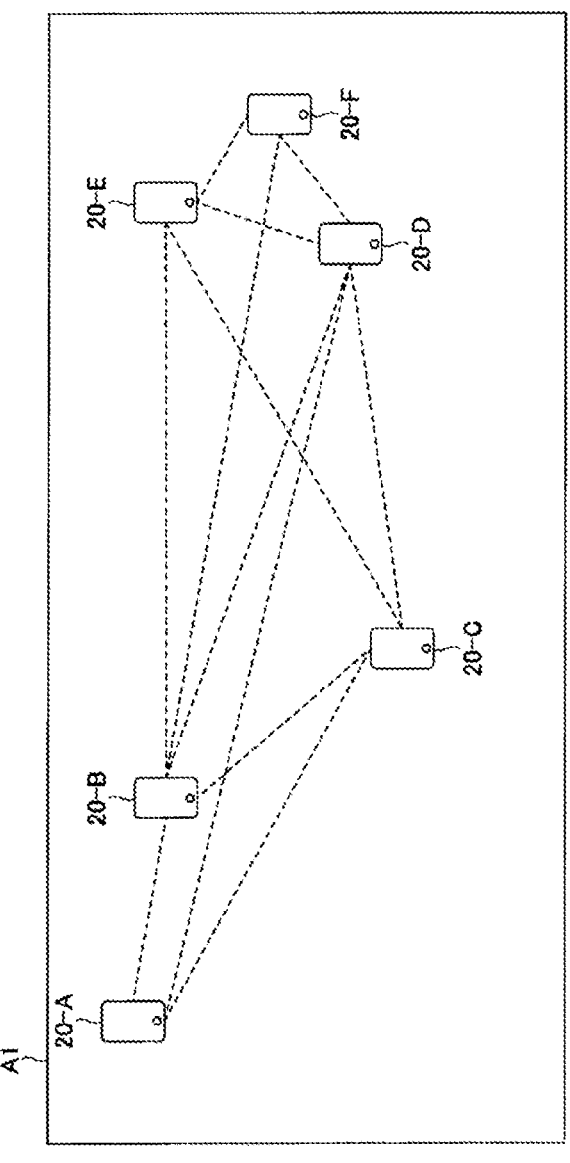
FIG. 5 is a diagram illustrating an example of paths between terminals 20.

FIG. 5 is a diagram illustrating an example of the paths between the terminals 20. In FIG. 5, broken lines connecting the terminals 20 indicates the paths (communication paths) between the terminals 20.

Figure 6:
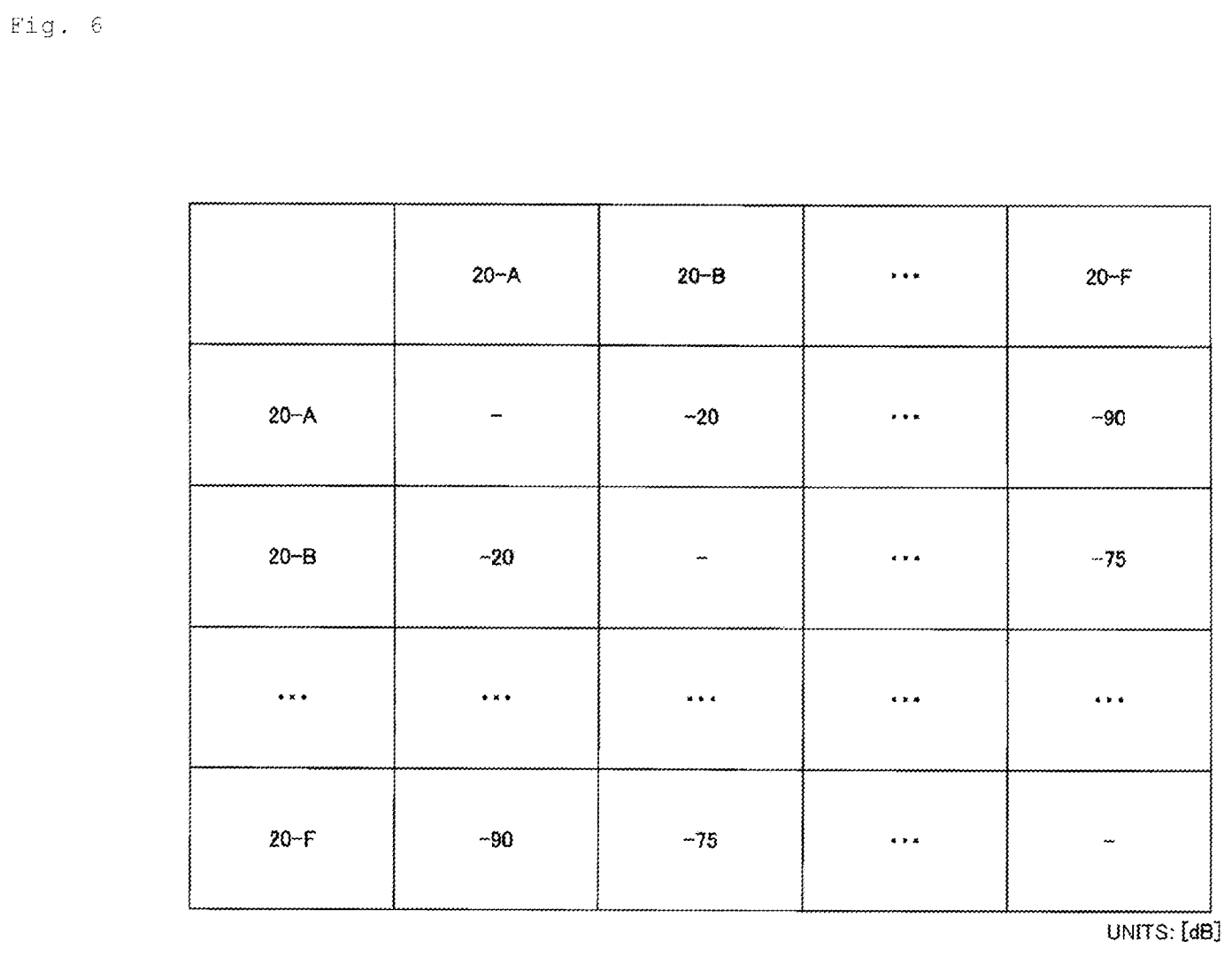

The radio wave propagation attenuation values can be calculated by using various radio wave propagation models considering ray tracing and shadowing based on area information (area size, arrangement state of walls and objects, material information, etc.) and terminal arrangement information. FIG. 6 illustrates an example of the calculation results of the radio wave propagation attenuation values of the paths between the terminals 20.

Subsequently, the wireless distance calculation unit 13 calculates a wireless distance of each of the paths between the terminals 20 based on the radio wave propagation attenuation values (S103). In the present embodiment, the wireless distance is an index value indicating the "distance from the viewpoint of radio communication" obtained by adding conditions of the radio environment to a physical distance (for example, when there is a shielding, the distance is made longer).

FIG. 7 illustrates an example of the result of calculation of the wireless distance between the terminals 20. The wireless distance can be calculated from each of the radio wave propagation attenuation values by, for example, assuming the transmission power to be a constant value and converting each of the radio wave propagation attenuation values to a distance assuming free space loss (square attenuation). Various attenuation models can also be used. Thus, the wireless distance can be calculated in consideration of area information (area size, arrangement state of walls and objects, material information, etc.).

Note that if radio wave propagation attenuation values and wireless distances are calculated for paths between all pairs of the terminals 20, there is a possibility that the calculation amount is increased depending on the condition. Thus, these values are calculated unilaterally assuming bidirectionality. Among all the pairs (paths) of the terminals 20, some pairs (paths) whose physical distances are apart by a certain distance or more can be made efficient by a method such as omitting calculation and setting a radio wave propagation attenuation value to a predetermined value or making a wireless distance infinite. For example, the radio wave propagation attenuation estimation unit 12 may calculate radio wave propagation attenuation values only for some pairs of terminals 20 whose physical distance(s) satisfy a predetermined condition. Specifically, the radio wave propagation attenuation estimation unit 12 may complement a radio wave propagation attenuation value by a predetermined value (for example, 200 dBm) without calculating the radio wave propagation attenuation value for terminals 20 separated by a predetermined distance or more (a pair of terminals 20 whose path length is equal to or more than a predetermined value). Also, the radio wave propagation attenuation estimation unit 12 may complement a radio wave propagation attenuation value by a predetermined value (for example, 5 dBm) without calculating the radio wave propagation attenuation value for terminals 20 located close to each other within a fixed range.

Subsequently, the clustering unit 14 clusters the terminals 20 into groups based on the wireless distance between the terminals 20 (S104). The clustering of the terminals 20 into the groups may be performed based on a known method. Hereinafter, each cluster generated by the clustering is referred to as a "terminal cluster".

Subsequently, the allocation position determination unit 15 executes determination processing of the allocation position of the base station 30 for each terminal cluster (S105).

Figure 8:
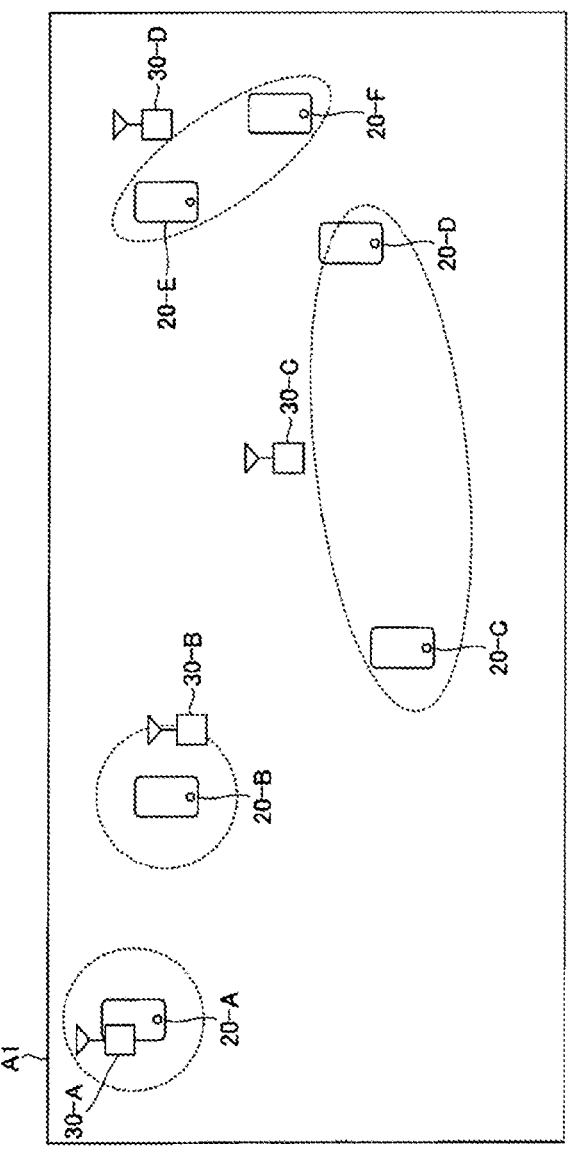
FIG. 8 is a diagram illustrating an example of a determination result of an allocation position of a base station 30.

FIG. 8 is a diagram illustrating an example of a determination result of an allocation position of the base station 30. FIG. 8 illustrates an example in which the terminals 20 are divided into terminal clusters indicated by broken line ellipses. In this state, one base station 30 is arranged for each terminal cluster, and the allocation position of each base station 30 is determined, for example, as illustrated in FIG. 8.

The actual allocation of base stations 30 may be manually performed, or may be performed by moving the base stations 30 mechanically (or automatically) by a robot, a drone, a rail or the like, or pseudo movement may be achieved by switching on/off of a plurality of base stations 30 allocated in advance.

Further, the processing procedure illustrated in FIG. 3 may be executed at a constant cycle, or may be executed in accordance with, for example, a change in the terminal arrangement information. By repeatedly executing the processing procedure illustrated in FIG. 3, the base stations 30 can be allocated at allocation positions suitable for the arrangement state of the terminals 20. However, the present embodiment may be used to determine fixed allocation positions of the base stations 30 in a situation where the arrangement positions of the terminals 20 are fixed.

Figure 9:
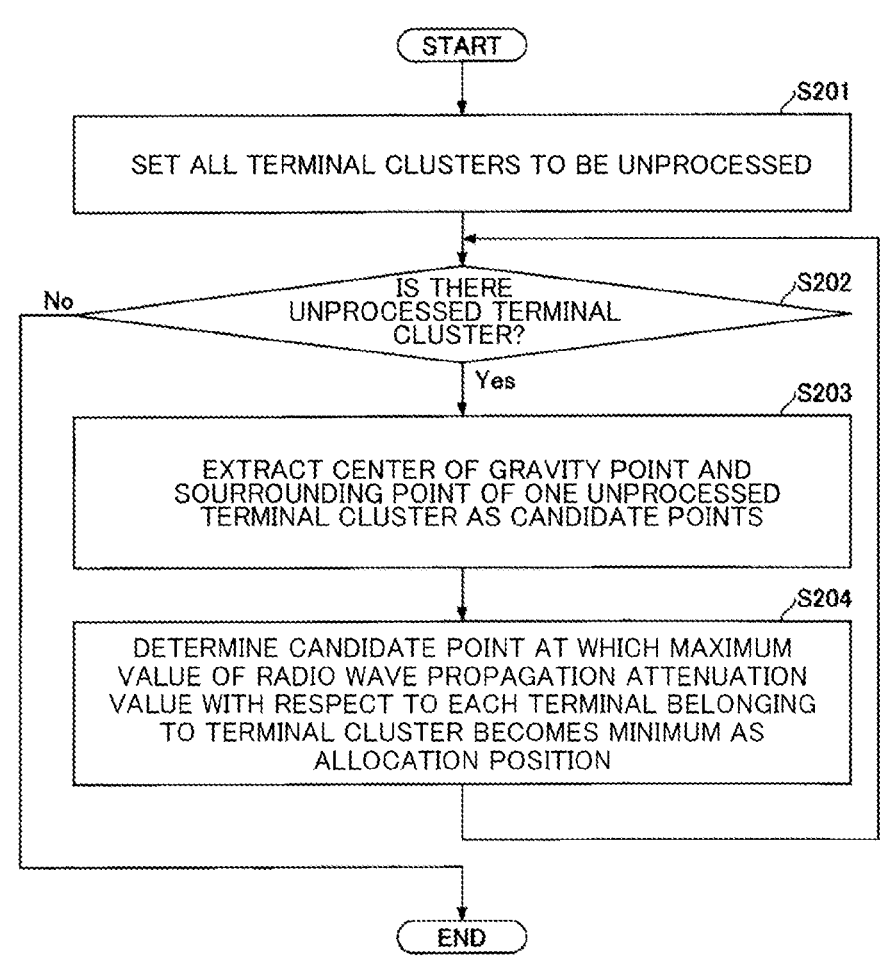
FIG. 9 is a flowchart illustrating an example of a processing procedure of determination processing of the allocation position of the base station 30.

Next, the step S105 will be described in detail. FIG. 9 is a flowchart illustrating an example of a processing procedure of determination processing of an allocation position of a base station 30.

In step S201, the allocation position determination unit 15 sets all terminal clusters to be unprocessed. "Unprocessed" means that the processing procedure of the step S203 and the subsequent steps is not a processing object.

Subsequently, the allocation position determination unit 15 determines the presence or absence of an unprocessed terminal cluster (S202). When there is an unprocessed terminal cluster (Yes in S202), the allocation position determination unit 15 selects one unprocessed terminal cluster to be processed, and extracts the center of gravity point of the selected terminal cluster (hereinafter referred to as "target cluster") and its surrounding points (total N (N≥1) points of center of gravity and surrounding points) as candidates for the allocation position of the base station 30 with respect to the target cluster (S203). Here, the surrounding points may be, for example, points having a plurality of predetermined distances and directions from the center of gravity point. Hereinafter, the points extracted as the center of gravity point or the surrounding point are referred to as "candidate points."

Subsequently, the allocation position determination unit 15 calculates a radio wave propagation attenuation value between each candidate point and each terminal 20 belonging to the target cluster, and determines a candidate point whose maximum value is the minimum as an allocation position of the base station 30 with respect to the target cluster (S204). The calculation of the radio wave propagation attenuation value at this time may be executed in the same manner as the step S102 in FIG. 3.

Subsequently, the allocation position determination unit 15 repeats the step S202 and the subsequent steps. When there is no unprocessed terminal cluster (No in S202), the allocation position determination unit 15 ends the processing procedure of FIG. 9.

As described above, according to the present embodiment, the terminals 20 are clustered based on radio wave propagation attenuation between the terminals 20 (based on wireless distances based on radio wave propagation attenuation), and the allocation positions of the base stations 30 are determined for respective clusters generated by the clustering. Therefore, the allocation of the wireless base stations in consideration of the radio wave propagation situation (shielding, radio wave reflection, etc.) can be supported.

Note that in the present embodiment, the radio wave propagation attenuation estimation unit 12 is an example of a first calculation unit. The wireless distance calculation unit 13 is an example of a second calculation unit. The allocation position determination unit 15 is an example of a determination unit.

Although embodiments of the present invention have been described in detail above, the present invention is not limited to the specific embodiments described above, and various modifications and changes can be made within the scope of the gist of the present invention described in the claims.

REFERENCE SIGNS LIST

10 Base station allocation support apparatus
11 Information acquisition unit
12 Radio wave propagation attenuation estimation unit
13 Wireless distance calculation unit
14 Clustering unit

15 Allocation position determination unit
20 Terminal
30 Base station
100 Drive device
101 Recording medium
102 Auxiliary storage device
103 Memory device
104 CPU
105 Interface device
B Bus
The invention claimed is:

1. A base station allocation support apparatus comprising:
a processor; and
a memory storing program instructions that cause the processor to:
   calculate radio wave propagation attenuation values between a plurality of wireless terminals in an area based on position information of each of the plurality of wireless terminals and information indicating a layout of the area;
   perform clustering on the plurality of wireless terminals based on the radio wave propagation attenuation values; and
   determine an allocation position of a wireless base station with respect to the plurality of wireless terminals based on a result of the clustering, wherein the allocation position is a point of a plurality of points, the plurality of points comprises a center of gravity point of a cluster of a plurality of clusters according to the performed clustering and a plurality of surrounding points of the cluster as extracted based on the center of gravity point of the cluster.

2. The base station allocation support apparatus according to claim 1, where the processor is further configured to:
   calculate a wireless distance based on each of the radio wave propagation attenuation values, and
   perform clustering on the plurality of wireless terminals based on the wireless distance.

3. The base station allocation support apparatus according to claim 1, wherein respective surrounding points of the plurality of surrounding points are extracted based at least on a predetermined physical distance from the center of gravity point toward a predetermined direction.

4. The base station allocation support apparatus according to claim 3, wherein the processor is configured to determine, among the center of gravity point and the surrounding points of the cluster, a point at which a maximum value of a radio wave propagation attenuation value with respect to each wireless terminal belonging to the cluster is a minimum as the allocation position of the wireless base station.

5. The base station allocation support apparatus according to claim 1, wherein the processor is configured to calculate a radio wave propagation attenuation value for, among the plurality of wireless terminals, wireless terminals whose physical distance satisfies a predetermined condition.

6. A base station allocation support method executed by a computer, the base station allocation support method comprising:
   calculating radio wave propagation attenuation values between a plurality of wireless terminals in an area based on position information of each of the plurality of wireless terminals and information indicating a layout of the area;
   performing clustering on the plurality of wireless terminals based on the radio wave propagation attenuation values; and
   determining an arrangement position of a wireless base station with respect to the wireless terminals based on a result of the clustering, wherein the arrangement position is a point of a plurality of points, the plurality of points comprises a center of gravity point of a cluster of a plurality of clusters according to the performed clustering and a plurality of surrounding points of the cluster as extracted based on the center of gravity point of the cluster.

7. A non-transitory computer-readable recording medium storing a program for causing a computer to function as the base station allocation support apparatus according to claim 1.

8. A base station allocation support apparatus comprising:
a processor; and
a memory storing program instructions that cause the processor to:
   calculate radio wave propagation attenuation values of radio wave propagation among a plurality of wireless terminals in an area, wherein the radio wave propagation attenuation values are based on position information of each wireless terminal of the plurality of wireless terminals and information indicating a layout of the area, and the plurality of wireless terminals satisfies a predetermined condition of physical distances among the plurality of wireless terminals;
   perform clustering on the plurality of wireless terminals based on the radio wave propagation attenuation values; and
   determine an allocation position of a wireless base station with respect to the wireless terminals based on a result of the clustering.

* * * * *